United States Patent [19]

Breen

[11] Patent Number: 4,818,100

[45] Date of Patent: Apr. 4, 1989

[54] LASER DOPPLER AND TIME OF FLIGHT RANGE MEASUREMENT

[75] Inventor: Michael T. Breen, Garden City, Mich.

[73] Assignee: Eaton Corporation, Cleveland, Ohio

[21] Appl. No.: 103,087

[22] Filed: Sep. 30, 1987

[51] Int. Cl.$^4$ ............................ G01C 3/08; G01P 3/36; G01B 11/26

[52] U.S. Cl. ........................................ 356/5; 356/28.5; 356/141; 356/152

[58] Field of Search ................... 356/5, 28.5, 141, 152

[56] References Cited

U.S. PATENT DOCUMENTS

| | | | |
|---|---|---|---|
| 3,652,161 | 3/1972 | Ross | 356/5 |
| 3,950,100 | 4/1976 | Keene et al. | 356/28.5 |
| 4,167,329 | 9/1979 | Jelalian et al. | 356/5 |
| 4,190,361 | 2/1980 | Dubrunfaut | 356/5 |
| 4,516,853 | 5/1985 | Pearson | 356/152 |
| 4,572,662 | 2/1986 | Silverman | 356/5 |
| 4,690,551 | 9/1987 | Edwards et al. | 356/5 |

Primary Examiner—Stephen C. Buczinski
Attorney, Agent, or Firm—C. H. Grace

[57] ABSTRACT

A hybrid laser distance gauge utilizes complementary simultaneous measurements based upon both Doppler and time of flight principles. A complete record can be produced of the location and shape of a target object even when the object has severe discontinuities such as the edges of a turbine blade. Measurements by the two principles are made by using many optical elements in common.

The Doppler measurements have an open loop optical/electronic arrangement in which the Doppler shift is converted to a voltage by a phase locked loop. The time of flight measurements are made at one or more harmonic frequencies of a mode locked pulse envelope wave train, for unusually accurate and unambiguous distance data.

10 Claims, 1 Drawing Sheet

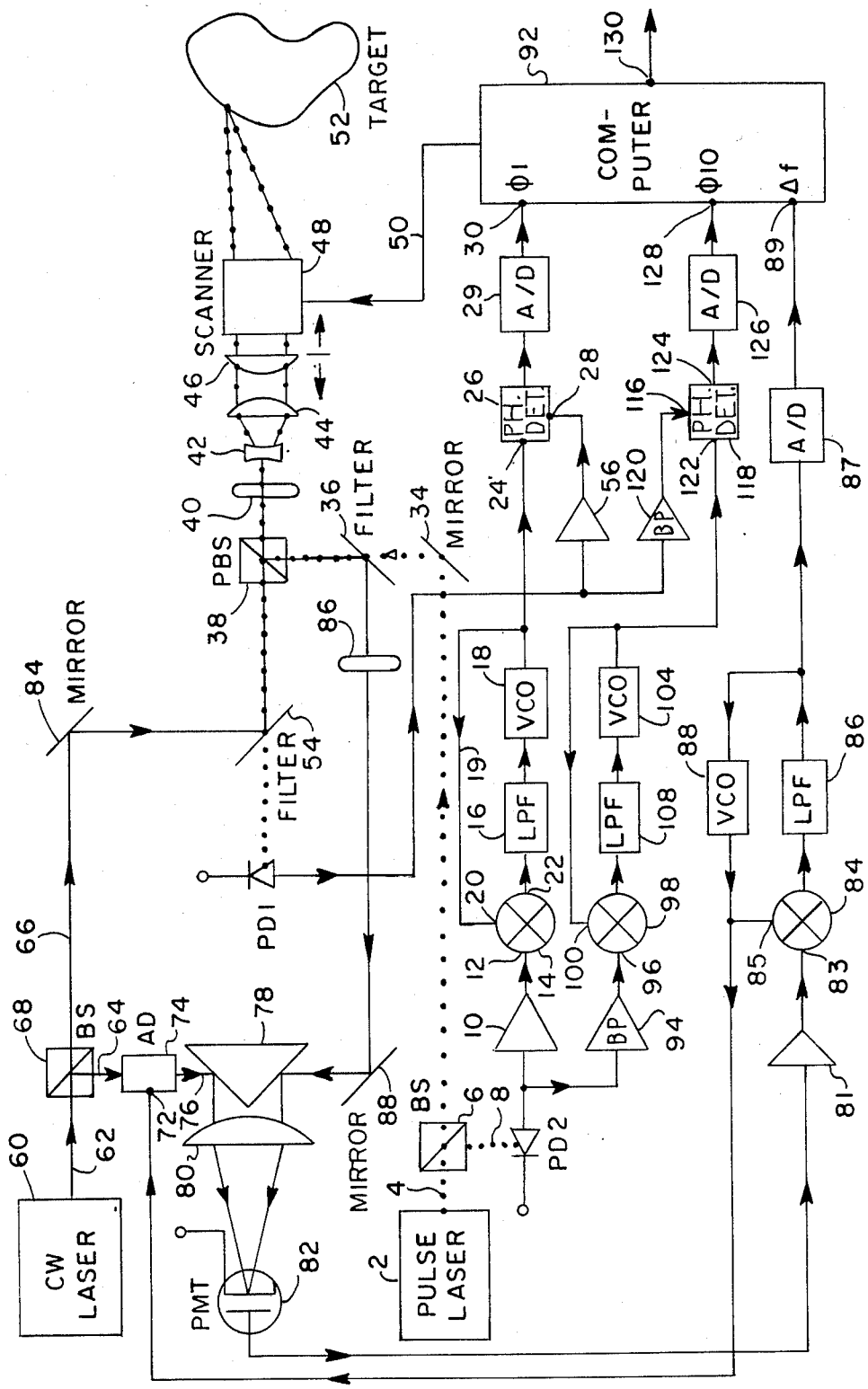

LASER DOPPLER AND TIME OF FLIGHT RANGE MEASUREMENT

CROSS-REFERENCES TO RELATED APPLICATIONS

This application is one of a group of related applications that were filed simultaneously in September, 1987, including Ser. No. 07/103,085 entitled "Dynamic Doppler Optical Gauge"; Ser. No. 07/103/086 entitled "Chirp Doppler Optical Gauge; Ser. No. 07/103,088 entitled "Optical Inspection Device and Method"; and Ser. No. 07/103,092 entitled "Laser Distance Measuring Method and Apparatus". All were invented by Michael T. Breen.

FIELD

The invention relates to instrumentation for very precisely measuring the position of an object relative to the measuring instrument, and/or the shape of the object, without mechanically contacting the object.

PRIOR ART

Many laser metrological instruments are already available that are based upon the principle of Doppler frequency shift of a laser beam, and others are available that are based upon measurements of the "time of flight" of a laser pulse from the gauge to the target and back. No available device appears to employ the combined concept and improvements of the present invention.

SUMMARY

The invention utilizes simultaneously both a Doppler shift principle of operation and an optical time of flight principle in a single integrated integrated device, to enable making absolute measurements with a very high degree of precision and a minimum of equipment.

An object of the invention is to provide a combination of a continuous wave Doppler system and a pulse envelope laser system. They are combined in such a way as to use many components in common, which is economical and which reduces inaccuracies due to common mode behavior.

Another object is to provide a combined system of measurement in which Doppler data and time of flight data are combined in such a way as to provide absolute distance measurements of high accuracy.

Another object is to provide a combined system of measurement in which abrupt discontinuities in a target whose shape is being measured do not prevent accurate measurement of the shape.

BRIEF DESCRIPTION OF THE DRAWINGS

The FIG. 1 is a simplified block diagram of a preferred embodiment of the invention.

DETAILED DESCRIPTION OF INVENTION

The invented gauge employs the principles of both optical time of flight ranging and Doppler shift optical heterodyning. The objective is for the time of flight system, which provides absolute, low resolution, large measurement range data, to compensate for the high resolution but limited bandwidth Doppler system, and vice versa. The result is a noncontact gauging device capable of high throughput, continuous absolute distance data, and very high local relative distance accuracy.

The object being measured can be as large as an airplane wing or an automobile hood stamping, or as small as an integrated circuit wafer. For such objects, the measuring time as compared with that of a stylus type of coordinate measuring machine is expected to be greatly reduced, to less than a minute as compared with several hours.

For measuring a three dimensional surface profile of an object, a Doppler system would normally suffice because only the distance variations from an arbitrary reference point on the surface would be necessary. The total absolute distance from the laser to the object would not directly affect a surface profile measurement. However, should the object surface contain a discontinuity (at an edge, perhaps), a Doppler system might not be able to track the discontinuity, and the time of flight system would be required to reorient the gauge.

When the surface geometry contains several edge discontinuities (as with a turbine blade), the invented noncontact coordinate measuring gauge can be programmed to scan one section a time using just Doppler shift detection. When scanning of that section is finished, the time of flight system can measure a discontinuous surface jump to the next section and, after the gauge is reoriented, the Doppler system can again take over the surface measurement.

For more continuous contours, the Doppler measurements bridge from each of the absolute measurements to the next. The system then has the benefit of a form of redundancy of the Doppler and the absolute measurements, and this increases the accuracy of the system if it is desired to process the data in this way.

More importantly, because the absolute distance measurements are made by a phase comparison system when the envelope pulses occur, i.e., at only particular discrete times, enhanced accuracy is obtainable. The accuracy realized from measurement of absolute distance is then distributed over the entire distance range by the Doppler measurements, which interpolate with extreme accuracy. The relatively accurate readings at selected discrete times are accomplished by filtering the output of a detector at integral multiples of the fundamental frequency of the mode locked laser, thereby achieving higher frequency, or more divisions on the time axis and thus, higher resolving power.

The output of the pulsed laser is divided and a fraction of it is directed to a photodiode, the output of which is passed through a narrow bandpass filter centered at the switching frequency. The filter is in a phase locked loop. The loop's voltage controlled oscillator signal can be thought of as a local oscillator. When the reflected light signal is detected and filtered in a similar manner, its signal is similar to the reference signal, except for the phase shift delay that occurred during its optical time of flight. This relative phase shift is detected, so that the distance measurement problem has been converted to a phase shift measurement problem, which can be accomplished more accurately.

In addition, the accuracy can be improved by using a higher multiple of the pulse frequency since many of the higher harmonics have amplitudes almost as great as the first. The term harmonic as used here includes the fundamental, called the first harmonic, as well as higher index harmonics (and subharmonics). The envelope pulse is of course not an idealized delta function, so the spectral distribution of its energy tends to be maximum at and near the lower harmonics, with less energy in the higher harmonics, i.e., the (sin x)/x distribution. Therefore, although the higher harmonic frequencies offer increased resolution, they also have progressively lower amplitudes and, at some harmonic number the signal to noise ratio limits the range resolution. When 82 MHz is the fundamental envelope pulse frequency, the low gigahertz region can be reached with good electronics design, before the signal to noise ratio gets too small. At 1 GHz, the distance resolution is of the order of 50 microns.

Details of the systems are as shown on FIG. 1. The time of flight system employs a mode-locked P-polarized Argon+ laser 2 with a pulse repetition frequency of 82 MHz. The processing of its signals involves comparing its electrical phase at two photodiodes PD1 and PD2, are positioned before and after the round trip to the target. Various passive optical components are used to facilitate alignment.

A train of optical pulses 4 is emitted by the laser 2. The energy is divided by a beam splitter 6, which redirects a reference beam portion 8 towards the reference channel photodiode detector PD2. The photodiodes are Antel AR-S2 diodes. The envelope of the pulse train is detected by PD2, and a corresponding electrical signal is conducted to a transistor amplifier 10. This is a narrow-band transistor circuit having a voltage gain of 10.

From the output of amplifier 10 a signal is connected to one input 12 of a phase comparator 14, which is a component of a phase locked loop. The other main components of the loop are a low pass filter 16 and a voltage controlled oscillator (VCO) 18. When this phase locked loop is locked onto the signal 12, its VCO 18 produces an output signal of the same frequency as that at 12, which is the fundamental frequency of the envelope of the pulse train, and which is applied via a feedback line 19 to another input terminal 20 of the phase comparator 14. A Mini Circuits Lab SRA-3 double balanced mixer was used in phase comparator 14. The phase comparator 14 has an output terminal 22, whose various output frequencies are filtered by the filter 16 to pass only a lowpass difference frequency. Control of the frequency of the VCO 18 is effected by the output of the filter 16.

Another connection from the output of VCO 18 goes to an input terminal 24 of a phase comparator 26. A second terminal 28 of phase comparator 26 receives a delayed pulse signal, as will be described below. The relative phase of the envelope signals at terminals 24 and 28 appears at the output of phase comparator 26, which can include a filter if desired. It is digitized by an analog to digital converter (A/D) 29, and led to a phase angle output terminal 30.

A second component 32 of the laser's output is intended for the target; it passes directly through beam splitter 6, reflects from a mirror 34, and passes directly through a filter 36 to a polarized beam splitter 38. There it is redirected through a quarter-wave plate 40, a diverging lens 42, and a lens system 44, 46. An optical scanner 48 directs the train of pulses in a direction controlled by control signals 50, which are received from a computer 92, to the target 50, from which it is reflected or scattered. The scanner 48 is preferably a galvanometer type.

The reflected return energy again traverses the scanner 48, the lenses 46, 44, 42, the plate 40, and the beam splitter 38. This time the beam passes directly through the beam splitter 38 and through a filter 54, and falls upon the photodiode detector PD1. The envelope of the pulse is detected in PD1, which sends an electrical signal to an amplifier 56, whose output drives the terminal 28 of the phase comparator 26.

Both of the inputs to phase detector 26 include the fundamental frequency of the envelope of the pulse train from laser 2. They differ in phase. Their phase difference is detected in 26 and output as a DC signal.

FIG. 1 includes a second phase locked loop and phase detection circuit very similar to the one just described, and which also receives its input signal from the reference photodiode PD2. However, it operates at a higher harmonic frequency of the pulse envelope wave shape, as follows. Narrow-band amplifier 94 is tuned to an appropriate higher harmonic of the laser's fundamental pulse repetition frequency and provides a strong envelope pulse reference signal to a terminal 96 of a mixer 98. At another input 100 of the mixer 98, a high harmonic frequency of the envelope pulse train, in this example the tenth harmonic, is provided by a VCO 104.

The frequency of VCO 104 is controlled by a DC signal from a lowpass filter 108, whose input is driven by the output of the mixer 98. The mixer 98 therefore correlates the tenth harmonic component of the signal at terminal 96 with the 820 MHz VCO signal at terminal 100. The relative phase between these 820 MHz signals produces a phase error signal at the mixer 98 output terminal, which is input to the lowpass filter 108. Thus the phase locked loop locks onto the tenth harmonic of the pulse train envelope.

A sample 114 of the output of the VCO 104 is conducted to a terminal 122 of another phase detector 118. There, it is compared with the target beam envelope waveform, which comes from photodiode PD1 via an amplifier 120 to an input terminal 116 of the phase detector 118. Phase detector 118 detects the tenth harmonic of that target beam envelope, with the reference-related signal at terminal 122 serving as a local oscillator or reference.

The relative phase between the 820 MHz signal at terminal 122 and the tenth harmonic of the envelope signal at terminal 116 determines the D.C. output voltage from phase detector 118, (which can include a filter as necessary), at its output terminal 124. The the resulting signal from the filter is a measure of the phase shift or the transit time of the tenth harmonic frequency. It is digitized in an analog to digital converter 126, and led to the computer 92, at a terminal 128.

The phase measurement signal at terminal 128 has the capability of being ten times as accurate (with respect to phase-related error sources) as the phase measurement of the fundamental frequency signal at terminal 30. Ambiguity of path length measurements at terminal 128 is easily eliminated by combining the data of terminals 128 and 30 in the computer 92. In a simplified version, the most significant bits of absolute distance data are provided by the fundamental frequency phase locked loop data of terminal 30 and less significant bits are provided by the higher harmonic frequency loop data of terminal 128.

One or both of the VCOs 18 and 104 can be square wave oscillators that have very small duty cycles, for producing output pulses that are as short as appropriate for good system design.

The Doppler measurements use a single-frequency Helium-Neon continuous-wave (CW) S-polarized laser 60 as a light source, FIG. 1. An interferometer concept is employed. First the output laser beam 62 is split into a reference leg 64 and a target leg 66, in a beam splitter 68. In the reference leg 64 of the interferometer, an offset or modulation frequency of 40 MHz is introduced from a local oscillator 73 to the modulation input terminal 72 of an acoustooptical (AO) modulator 74. The origin of the Doppler shift information for terminal 72 is described later. The AO modulator 74 is preferably a Bragg cell.

Exiting from the AO modulator 74 is an offset-frequency reference beam 76, which is then reflected from a dihedral mirror 78. It passes through a converging lens 80 and falls upon the photosensitive surface of a photomultiplier tube 82. Also impinging on the photodiode 82 is CW energy that was reflected from the target object 52, as will be described further below.

Radiation in the target leg 66 of the interferometer is redirected at a mirror 84, and again at the filter 54, as shown in FIG. 1. It passes through the polarized beam splitter 38, the quarter-wave plate 40, and the lenses 42, 44, and 46. The CW Doppler beam is then deflected directionally in the scanner 48 under the control of computer signals 50, as was the pulse train. It propagates to the target 52 and is reflected or scattered back to the scanner 48.

Upon its reflection, the Doppler target beam is frequency modulated by the rate of change of radial distance between the target reflection spot and the laser gauge. The Doppler effect occurs irrespective of whether the rate of change of radial distance is due to actual relative motion of the target or to scanning of the reflection spot over the contour of the target, (or to both causes).

The reflected Doppler beam again traverses the optical path comprising elements 46, 44, 42, 40 and 38. At the polarized beam splitter 38 the beam is reflected to a filter 36, where it is again reflected, to pass through a half-wave plate 86. Thereafter the beam reflects from a mirror 88, then from a face of the mirror 78, and passes through the lens 80. This return energy of the target leg strikes the photosensitive surface of the photomultiplier tube 82 along with the reference beam.

Thus the return beam is recombined with the reference beam at elements 78, and 80, and the envelope or interference pattern of the combined beam is detected at photomultiplier 82. An advancing target increases the return wave frequency and a receding target reduces the return wave frequency. The 40 MHz component of frequency at the AO modulator terminal 72 is an offset that is provided to facilitate determination of the sign of the Doppler shift frequency.

In the detection process in the photomultiplier tube 82, the Doppler shift interacts with the reference beam to frequency modulate a 40 MHz component. That 40 MHz frequency is frequency modulated by an error signal.

The electronic processing circuits that track the Doppler shift operates as follows. Frequency demodulation is accomplished in the preferred embodiment by means of a phase locked loop comprising a mixer 84, a lowpass filter 86, and a VCO 88. The output from the photomultiplier 82 is connected via an amplifier 81 to one input terminal 83 of a phase comparator 84, which has another input terminal 85 for receiving a signal from VCO 88. Output from the phase comparator 84 goes to the low pass filter 86, and the filter's output signal drives the frequency control input terminal of the VCO 88. The free-running frequency VCO 88 is 40 MHz. Because of the negative feedback, the VCO 88 oscillates at a frequency that tracks and copies the frequency at the terminal 83.

The value of the lowpass output signal of the loop filter 86 depends upon the Doppler shift frequency. A sample of that lowpass signal is conducted to an A/D 87, where it is digitized.

The A/D output, at computer terminal 89, is digital Doppler data. It is integrated and combined in the computer 92 with absolute distance data that the computer receives at its terminals 30 and 128. In a simple system in which very little manipulation of the data is employed, the progressive changes of radial distance that are measured by the Doppler system are added algebraically to the most recent absolute distance measurement. The final result, which is absolute continuous distance data, is available at a computer output bus 130.

In a slightly more refined embodiment, the time of flight absolute distance measurements produce a distance data as a function of spot location having a number N of binary digits. Even its least significant bit is rather large. On the other hand the Doppler portion of the gauge produces, after integration, relative distance measurements indicating the difference in radial distance from one spot on the target to another, and its most significant bit is by design slightly more significant that the least significant bit of the time of flight data.

One of more Doppler data bits overlap one or more time or flight data bits. The overlapping bits enable the time of flight measurements to establish benchmarks for the Doppler measurements. The conflict between low significance time of flight bits and high significance Doppler bits is resolved in favor of the Doppler bits because of their inherent capability for greater accuracy. At least some of the time of flight bits of least significance are therefore discarded in favor of the Doppler data.

As designed, the apparatus can measure position very accurately, following calibration, even when the object being measured is moving at speeds of 10 inches per second or more.

Each of the two principles of operation (Doppler and time of flight) compensates for the shortcomings of the other; the two techniques complement each other to produce high performance. Many optical components, power supplies, etc. are used in common for the two types of measurements. The use of parts in common for the two measurement principles reduces the cost when compared with separate systems, and the commonality of optical paths and other components enables the data derived under the two principles to be combined on an accurate and internally consistent basis. Many common mode errors cancel out.

Numerous other variations and embodiments are also possible within the scope of the claims. For example, the phase locked loop 84, 86, 88, which serves as a frequency demodulator to extract Doppler data by measuring the voltage required to lock the VCO 88 onto the frequency from the photodiode 82, could be replaced by any of several other frequency discriminator circuits capable of performing the same function, with different accuracy, cost, etc. The gauge, especially the pulsed portion, can be implemented at considerably less expense with a semiconductor laser instead of the Argon+ laser; that might reduce the maximum range of measurement. The choice of harmonic number in the example above is arbitrary; for some situations a fifth or other harmonic might be best.

What is claimed is:

1. A hybrid distance gauge for measuring the distance from a fixed point to a target, comprising:

laser means for providing a continuous laser light wave and a laser light pulse train whose envelope waveform comprises a fundamental first harmonic component whose frequency is the laser light pulse train's pulse repitition frequency and a plurality of higher harmonic components, the frequency of each of which is an integral multiple of said pulse repetition frequency;

means for obtaining both a reference beam based upon the continuous laser light wave and a target beam of the laser continuous light wave and for obtaining both a reference beam based upon the laser light pulse train and a target beam of the pulse train;

unitary optical means for directing said target beam of the continuous laser light wave and the target beam of the pulse train across the distance to said target for reflection and return propagation therefrom;

means responsive to said pulse train reference beam for providing a locally generated pulse train whose pulse repetition frequency is equal to that of one predetermined harmonic component of said harmonics including said first harmonic of the reference pulse train envelope and whose phase has a predetermined relationship to the phase of said one predetermined harmonic component of the reference pulse train envelope;

phase comparison means for comparing the phase of said locally generated pulse train with the phase of that harmonic number component of the return target pulse train and outputting a first signal indicative thereof;

comparison means for comparing the frequency of said continuous laser light wave reference beam with the frequency of said return continuous laser light wave and outputting a second signal indicative thereof;

data processing means receiving said first and second output signals for combining said first and second output signals into composite data indicative of the distance to places of reflection on said target.

2. A gauge as in claim 1 and further comprising:

second means responsive to said pulse train reference beam, for providing a second locally generated pulse train whose frequency is a second predetermined harmonic frequency of the reference pulse train envelope and whose phase has a determinable relationship to the phase of that harmonic component of the reference pulse train envelope; and, phase comparison means for comparing the phase of said second locally generated pulse train with the phase of that harmonic number component of the return target pulse train and outputting a third signal indicative thereof;

wherein said data processing means further comprises means for combining said third output signal into said composite data.

3. A gauge as in claim 2 and wherein the harmonic frequencies of said first locally generated pulse train and said second locally generated pulse train are different by at least five harmonic numbers, and wherein said data processing means comprises means for resolving ambiguities of distance data obtained from from one of said locally generated pulse train harmonics by correlating said data with distance data obtained from the other of said locally generated pulse train harmonics.

4. A gauge as in claim 1 and wherein said comparison means for comparing the frequency of said continuous laser light wave reference beam with the frequency of said return continuous laser light wave and outputting a second signal indicative thereof comprises frequency demodulator means for detection of the Doppler shift of said return continuous laser light wave.

5. A gauge as in claim 4 and wherein said frequency demodulator means comprises closed optical loop means for frequency modulating said continuous laser light wave reference beam with a replica of the Doppler shift frequency, and further comprises means for locally generating said replica of said Doppler shift frequency.

6. A gauge as in claim 5 and wherein said means for frequency modulating said continuous laser light reference beam comprises acoustooptical modulator means interposed in said continuous laser light reference beam and responsive to modulation signals for frequency modulating said beam.

7. A gauge as in claim 4 and wherein said frequency demodulator means comprises phase locked loop means for tracking the return signal.

8. A gauge as in claim 1 and wherein said unitary optical means for directing said target beam of the continuous laser light wave and the target beam of the pulse train across the distance to said target for reflection and return propagation therefrom comprises optical scanning means for deflecting said target beams to various locations on said target for reflection.

9. A gauge as in claim 8 and wherein said scanning means comprises means for receiving directional control signals and for responding to them by deflecting said target beams, and wherein said gauge further comprises computer means communicating with said scanning means for providing said directional control signals.

10. A gauge as in claim 1 and wherein:

said first and second signals comprise digital data having digits of more and less significance, said less significant digits of said first signal redundantly overlapping in significance the more significant digits of said second signal;

said composite data comprises digital data having digits of more and less significance;

said data processing means comprises means for utilizing in said more significant digits of said composite data the more significant digits of said first signal and for utilizing in said less significant digits of said composite data the less significant digits of said second signal, and for combining said first and second signals in an overlapping region of redundant significance of said first and second signals.

* * * * *